Feb. 5, 1957 G. W. SOETE 2,780,111
PRESSURE OPERATED CONTROL MECHANISM
Filed May 13, 1955 2 Sheets-Sheet 1
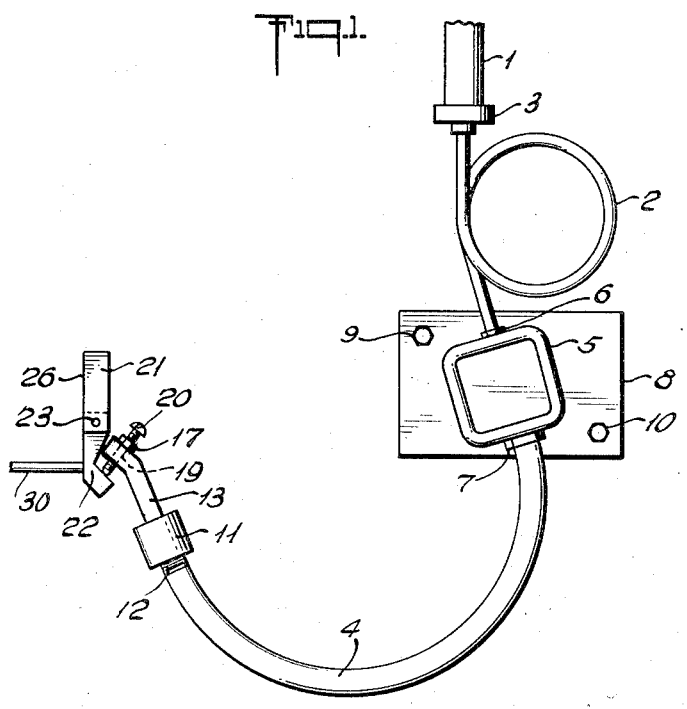
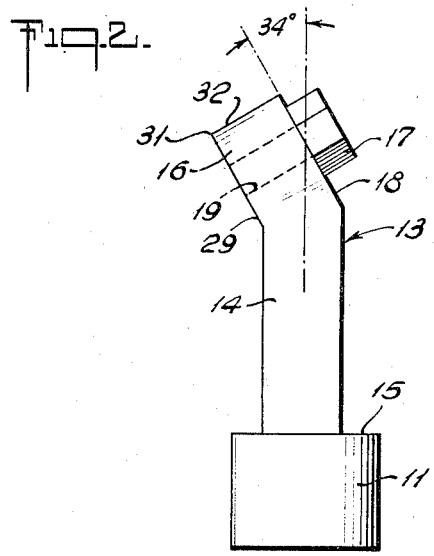
INVENTOR
GEORGE W. SOETE
BY
ATTORNEY Feb. 5, 1957
G. W. SOETE
2,780,111
PRESSURE OPERATED CONTROL MECHANISM
Filed May 13, 1955
2 Sheets-Sheet 2
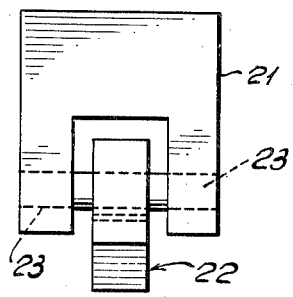
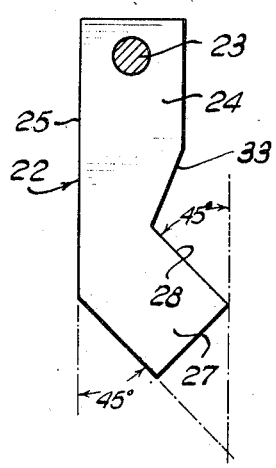
INVENTOR
GEORGE W. SOETE

United States Patent Office 2,780,111
Patented Feb. 5, 1957

2,780,111

PRESSURE OPERATED CONTROL MECHANISM

George W. Soete, Princeton, N. J., assignor, by mesne assignments, to the United States of America as represented by the Secretary of the Navy Application May 13, 1955, Serial No. 508,333

1 Claim. (Cl. 74—522)

This invention concerns pressure operated control mechanisms of the Bourdon tube type.

A Bourdon tube is a blind curved elastic tube, oval in section and open at one end to the fluid whose pressure is to perform a desired function; the fluid pressure tends to straighten out the Bourdon tube. Pressure acts equally on every square inch of area in the tube, but since the surface area on the outside of the curve is greater than the surface area on the inside of the curve, the force acting on the surface area on the outside of the curve is greater than the force acting on the surface area on the inside of the curve. When pressure is applied, the tube straightens out until the difference in force is balanced by the elastic resistance of the material composing the tube. When the fluid pressure drops, the Bourdon tube contracts in radius and when the fluid pressure rises, the Bourdon tube expands in radius.

The principal object of this invention is the provision of a new and improved pressure operated control mechanism of the Bourdon tube type.

An object of this invention is the provision of a new and improved pressure operated control mechanism having an adjustable output force control.

An object of this invention is the provision of a new and improved pressure operated control mechanism having input pressure stabilization.

An object of this invention is the provision of a new and improved pressure operated control mechanism having input temperature stabilization.

An object of this invention is the provision of a new and improved pressure operated control mechanism protected against vibrations.

A further object of this invention is the provision of a new and improved pressure operated control mechanism of high efficiency.

Other objects and many of the attendant advantages of this invention will be readily appreciated as the same becomes better understood by reference to the following detailed description when considered in connection with the accompanying drawings wherein:

Fig. 1 is the pressure operated control mechanism of the present invention in simple schematic presentation; and Fig. 2 is an enlarged coplanar view of the tip assembly of the pressure operated control mechanism of the present invention, as shown in Fig. 1;

Fig. 3 is an enlarged view of the lever assembly of the pressure operated control mechanism of Fig. 1 taken in a plane perpendicular to that of presentation of Fig. 1; and Fig. 4 is an enlarged coplanar view of the lever link of the pressure operated control mechanism of the present invention, as shown in Fig. 1.

Fig. 1 is the pressure operated control mechanism of the present invention in simple schematic presentation. The input fluid pipe, tube, or hose 1 is connected to the stabilizing tube 2 by the union 3. The stabilizing tube 2 is of coiled configuration and is preferably a single circular loop of small diameter tubing. The stabilizing tube 2 is connected to the Bourdon tube 4 through the tube socket 5; the stabilizing tube 2 being connected to the tube socket 5 by the joint 6 and the Bourdon tube 4 being connected to the tube socket 5 by the joint 7. The tube socket 5 is affixed to the platform 8, which is vibration mounted to the mechanism housing (not shown in the figures) through the bolts 9 and 10 and helical springs (not shown in the figures).

The Bourdon tube 4 is sealed by the tip 11 through the joint 12. The tip arm 13 is firmly affixed to the tip 11. Fig. 2 is an enlarged coplanar view of the tip assembly of the pressure operated control mechanism of the present invention, as shown in Fig. 1. The tip arm 13 has a major leg 14, which is substantially perpendicular to the end surface 15 of the tip 11, and an integral minor leg 16, which is inclined at an angle from said major leg. A preferred angle of inclination between the major leg 14 and the minor leg 16 of the tip arm 13 is about 34 degrees, as indicated in Fig. 2.

A lock nut 17 is positioned on the upper surface 18 of the minor leg 16 of the tip arm 13 at the upper mouth of a threaded hole 19 through said minor leg. The set screw 20 is threaded through the lock nut 17 and is threaded through the hole 19 in movable position substantially perpendicular to the upper surface 18 of the minor leg 16.

The lever bracket 21 is supported by the mechanism housing (not shown in the figures). Fig. 3 is an enlarged view of the lever assembly of the pressure operated control mechanism of Fig. 1 taken in a plane perpendicular to that of presentation of Fig. 1. The lever link 22 is rotatably supported by the lever pin 23 through holes in the lever bracket 21 and the lever link. Fig. 4 is an enlarged coplanar view of the lever link of the pressure operated control mechanism of the present invention, as shown in Fig. 1. The lever link 22 has a major leg 24, the major surface 25 of which is coplanar with the corresponding surface 26 of the lever bracket 21 when the mechanism 15 is at rest, as shown in Fig. 1. The lever pin 23 passes through a hole in the major leg 24 of the lever link 22.

The lever link 22 has an integral minor leg 27 which is inclined at an angle from the major leg 24. A preferred angle of inclination between the major leg 24 and the minor leg 27 of the lever arm 22 is about 45 degrees, as indicated in Fig. 4. The lever link 22 hangs in substantially vertical position when the mechanism is at rest. When the Bourdon tube 4 is at rest the major leg 14 of the tip arm 13 is inclined at a small angle with the vertical. The angle of inclination of the major leg 14 of the tip arm 13 is inclined at about 11 degrees with the vertical in Fig. 1. Thus, when the mechanism is at rest, as shown in Fig. 1, the upper surface 28 of the minor leg 27 of the lever link 22 is substantially parallel to the lower surface 29 of the minor leg 16 of the tip arm 13.

The point of the set screw 20 contacts the upper surface 28 of the minor leg 27 of the lever link 22. The major surface 25 of the lever link 22 contacts the end of the control rod 30. When the mechanism is at rest, the point of contact of the control rod 30 and the major surface 25 of the lever link 22 is substantially horizontally colinear with the point of contact of the set screw 20 and the upper surface 28 of the minor leg 27 of the lever link 22.

The pressure operated control mechanism of the present invention operates as follows.

The input fluid flows through the input fluid pipe 1 and the stabilizing tube 2. The stabilizing tube 2 aids in smoothing out pulsations in the fluid and protects the Bourdon tube 4 from the high temperature of said fluid. The fluid then flows through the tube socket 5 to the Bourdon tube 4. The tube socket 5 aids in further smoothing out pulsations in the fluid and is vibration mounted to protect the Bourdon tube from machine vibrations or outside vibrations.

When the set screw 20 is adjusted, by being moved axially upward in the hole 19, the leading edge 31 of the junction of the lower surface 29 and the upper surface 32 of the minor leg 16 of the tip arm 13 contacts the indented lower surface 33 of the major leg 24 of the lever link 22. In this position, the only contact between the tip arm 13 and the lever link 22 is made by the leading edge 31 on the indented lower surface 33 of the major leg 24 of said lever link; the point of the set screw 20 is separated by a selected distance from the upper surface 28 of the minor leg 27 of said lever link.

When the fluid pressure increases, the Bourdon tube 4 tends to straighten itself out in proportion to the fluid pressure in it, so that the tip arm 13 tends to move downward and toward the control rod 30. The tendency of the Bourdon tube to move downward and toward the control rod 30 imposes a force on the lever link 22 at the point of contact of the leading edge 31. The resultant of the forces on the lever link 22 produces an axial force on the control rod 30 through said lever link. This resultant force is applied at such a short distance on the lever link 22 from the lever pin 23, that it is substantially unaltered by any lever action and is essentially the resultant force exerted by the tip arm 13.

When the set screw 20 is adjusted, by being moved axially downward in the hole 19, the point of the set screw 20 contacts the upper surface 28 of the minor leg 27 of the lever link 22. In this position, the only contact between the tip arm 13 and the lever link 22 is made by the point of the set screw 20 on the upper surface 28 of the minor leg 27 of said lever link; the leading edge 31 of the junction of the lower surface 29 and the upper surface 32 of the minor leg 16 of said tip arm is separated by a selected distance from the indented lower surface 33 of the major leg 24 of said lever link.

When the fluid pressure increases, the Bourdon tube 4 tends to straighten itself out in proportion to the fluid pressure in it, so that the tip arm 13 tends to move downward and toward the control rod 30. The tendency of the Bourdon tube to move downward and toward the control rod 30 imposes a force on the lever link 22 at the point of contact of the set screw 20. The resultant of the forces on the lever link 22 produces an axial force on the control rod 30 through said lever link. This resultant force is applied at a sufficient distance on the lever link 22 from the lever pin 23 to impose an added moment on the control rod 30 due to lever action of said lever link about said lever pin. The force exerted by the Bourdon tube under increased fluid pressure is thus magnified in its application to the control rod.

The pressure operated control mechanism of the present invention thus has an adjustable output force control in the tip arm 13 and lever link 22 through the set screw 20. The axial force applied to the control rod 30 is essentially that exerted by the tip arm 13, when the set screw 20 is positioned upward in its hole 19. The axial force applied to the control rod 30 is that exerted by the tip arm 13 magnified by the lever action of the lever link 22 about the lever pin 23, when the set screw 20 is positioned downward in its hole 19.

Obviously many modifications and variations of the present invention are possible in the light of the above teachings. It is therefore to be understood that within the scope of the appended claim the invention may be practiced otherwise than as specifically described.

I claim:

An improved pressure operated control mechanism comprising a pivot pin defining an axis, a rigid lever link mounted on said pivot pin for pivotal movement about said axis, a control element engaging said lever link a first distance from said axis, the side of said lever link opposite that engaged by said control element being formed with first and second planar surfaces extending inwardly thereof at an angle to each other and intersecting at a line that is perpendicular to said control element, a Bourdon tube whose open end is secured in fixed position relative to said axis and which loops around toward said lever link, a rigid tip arm rigidly secured to the closed end of said Bourdon tube and forming an extension thereof, said tip arm terminating at its free end in a straight edge transverse thereto which edge is adapted to abut said first surface of said lever link at a second distance from said axis, a screw threadedly engaging said tip arm between the ends thereof and extending laterally of said tip arm, a locknut on said screw, one end of said screw being adapted to abut said second surface of said lever link at a third distance from said axis, said third distance being longer than said second distance, whereby said screw may be adjusted so that it abuts said second surface of said lever link and the transverse edge of said lever link is spaced from said first surface or said screw may be adjusted so that the transverse edge of said tip arm engages said first surface of said lever link and the end of said screw is spaced from said second surface of said lever link.

References Cited in the file of this patent

UNITED STATES PATENTS

| | | |
|---|---|---|
| 1,195,750 | Trane | Aug. 22, 1916 |
| 2,251,129 | Hammond | July 29, 1941 |

FOREIGN PATENTS

| | | |
|---|---|---|
| 597,644 | Great Britain | Jan. 30, 1948 |